(12) United States Patent
Dowle et al.

(10) Patent No.: US 12,157,435 B2
(45) Date of Patent: Dec. 3, 2024

(54) STORAGE TUNNEL ASSEMBLY FOR THE BED OF A PICKUP TRUCK OR OTHER VEHICLE

(71) Applicant: Rivian IP Holdings, LLC, Plymouth, MI (US)

(72) Inventors: James Dowle, Laguna Beach, CA (US); Barry Lett, Chobham (GB); Nick Malachowski, Irvine, CA (US); Mark Taylor, Laguna Beach, CA (US); Philipp Wolf, Capo Beach, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 350 days.

(21) Appl. No.: 17/825,401

(22) Filed: May 26, 2022

(65) Prior Publication Data

US 2023/0382309 A1    Nov. 30, 2023

(51) Int. Cl.
*B60R 5/04* (2006.01)
*B62D 33/02* (2006.01)
*B62D 33/08* (2006.01)

(52) U.S. Cl.
CPC .............. *B60R 5/045* (2013.01); *B62D 33/02* (2013.01); *B62D 33/08* (2013.01)

(58) Field of Classification Search
CPC ......... B60R 5/045; B60R 11/06; B62D 33/02; B62D 33/08; B62D 33/0207; B62D 33/03; B62D 33/046; B60P 1/64; B60P 7/14
USPC .......... 296/37.5, 37.6, 24.43, 24.45, 24.3, 3, 296/24.44; 224/403, 497; 280/769
See application file for complete search history.

(56) References Cited

U.S. PATENT DOCUMENTS

| | | | | |
|---|---|---|---|---|
| 4,749,226 A * | 6/1988 | Heft | ................... | B62D 33/0273 296/37.6 |
| 4,750,773 A * | 6/1988 | Chapline | ................. | B60R 11/06 296/37.6 |
| 5,464,264 A * | 11/1995 | Wilson | ...................... | B60R 9/00 296/183.1 |
| 5,615,922 A * | 4/1997 | Blanchard | ................. | B60R 9/02 224/404 |
| 5,893,597 A * | 4/1999 | Rider | ........................ | B60R 9/00 296/37.6 |
| 6,186,575 B1 * | 2/2001 | Fisher | .................. | B62D 47/003 296/37.6 |

(Continued)

*Primary Examiner* — Jason S Morrow
*Assistant Examiner* — Wenwei Zhuo
(74) *Attorney, Agent, or Firm* — Foley & Lardner LLP (57) ABSTRACT

A storage tunnel assembly for the bed of a pickup truck or other vehicle. The storage tunnel assembly generally includes a deployable vertical wall separated from a bulkhead of the bed and disposed across a width of the bed and a deployable cover separated from a floor of the bed between the vertical wall and the bulkhead and disposed across the width of the bed. The vertical wall, the cover, the bulkhead, and the floor define a storage space within a space defined by the bed. The vertical wall and the cover may be fixed components, separate components, and/or hinged components in various assemblies. One or both side walls of the bed define a storage tunnel access opening coincident with the storage space defined by the vertical wall, the cover, the bulkhead, and the floor and may include a door adapted to selectively open and close the associated storage tunnel access opening.

20 Claims, 8 Drawing Sheets

(56) References Cited

U.S. PATENT DOCUMENTS

| | | | | |
|---|---|---|---|---|
| 6,224,138 B1* | 5/2001 | Adsit | ............... | B60J 7/041 |
| | | | | 224/404 |
| 6,328,365 B1* | 12/2001 | Adsit | ............... | B60R 11/06 |
| | | | | 296/37.16 |
| 6,536,826 B1* | 3/2003 | Reed | ............... | B60P 3/42 |
| | | | | 224/404 |
| 6,966,593 B2* | 11/2005 | Plentis | ............... | B60R 9/02 |
| | | | | 296/37.6 |
| 6,986,541 B1* | 1/2006 | Haack | ............... | B62D 33/02 |
| | | | | 224/404 |
| 7,631,919 B2* | 12/2009 | Schrader | ............... | B62D 25/10 |
| | | | | 296/37.6 |
| 10,118,471 B1* | 11/2018 | White | ............... | B60J 7/198 |
| 10,399,505 B1* | 9/2019 | Brackman | ............... | B60R 9/065 |
| 11,007,949 B2* | 5/2021 | Singer | ............... | B60P 3/42 |
| 11,034,393 B1* | 6/2021 | Ionescu | ............... | B62D 33/0273 |
| 2004/0169389 A1* | 9/2004 | Leitner | ............... | B60R 9/00 |
| | | | | 296/37.6 |
| 2005/0134066 A1* | 6/2005 | Milenovich | ............... | B62D 33/0612 |
| | | | | 296/24.33 |
| 2009/0250962 A1* | 10/2009 | Polewarczyk | ............... | B60P 7/14 |
| | | | | 296/57.1 |
| 2018/0086277 A1* | 3/2018 | Wilson | ............... | B60R 11/06 |

* cited by examiner

STORAGE TUNNEL ASSEMBLY FOR THE BED OF A PICKUP TRUCK OR OTHER VEHICLE

INTRODUCTION

The present disclosure relates generally to the automotive field. More particularly, the present disclosure relates to a storage tunnel assembly for the bed of a pickup truck or other vehicle.

In a pickup truck or other vehicle, a long, flat bed is often desirable for carrying items such as all-terrain vehicles (ATVs), bikes, skis, surfboards, lumber, etc. However, it is also sometimes desirable to have covered storage in such a bed that is clean and weatherproof, for items such as tools, etc. Aftermarket stowage boxes are often used for such purpose, but sacrifice bed length and are generally cumbersome to place and remove. Thus, there is an inevitable tradeoff between bed length and covered storage space. One possible solution is to provide covered storage space underneath the bed of a pickup truck or other vehicle, but such covered storage space is limited at best.

This background is provided as illustrative environmental context only and should not be construed to be limiting in any manner. The concepts and principles of the present disclosure may be implemented in other environmental contexts equally without departing from the spirit and scope of the disclosure.

SUMMARY

The present disclosure provides a relatively large, covered, weatherproof, secure storage compartment that may be selectively deployed within the bed of a pickup truck or other vehicle when desired, and collapsed when a long, flat bed is needed. No heavy, bulky stowage box must be placed, removed, and stored.

The present disclosure provides a storage tunnel assembly for the bed of a pickup truck or other vehicle. The storage tunnel assembly generally includes a deployable vertical wall separated from a bulkhead of the bed and disposed across a width of the bed and a deployable cover separated from a floor of the bed between the vertical wall and the bulkhead and disposed across the width of the bed. The vertical wall, the cover, the bulkhead, and the floor define a storage space within a space defined by the bed. The present disclosure also provides a vehicle utilizing such a storage tunnel assembly and a method for providing such a storage tunnel assembly.

In one illustrative embodiment, the vertical wall is rigidly attached or disposed adjacent to the cover in a substantially perpendicular configuration, such that the vertical wall and the cover may be collectively rotated or separately repositioned such that the vertical wall is repositioned to form at least a part of or be disposed adjacent to the bulkhead and the cover is repositioned to form at least a part of or be disposed adjacent to the floor. This reconfiguration serves to eliminate the storage space from within or divide the space defined by the bed.

In another illustrative embodiment, the vertical wall is pivotably attached to the cover, such that the vertical wall and the cover may be partially or wholly collapsed together, collectively rotated, and un-collapsed such that the vertical wall is repositioned to form at least a part of or be disposed adjacent to the bulkhead and the cover is repositioned to form at least a part of or be disposed adjacent to the floor. This reconfiguration serves to eliminate the storage space from within or divide the space defined by the bed.

In a further illustrative embodiment, the vertical wall is pivotably attached to the cover and one of the cover is pivotably attached to the bulkhead and the vertical wall is pivotably attached to the floor, such that the vertical wall and the cover may be partially or wholly collapsed together, reoriented, and un-collapsed such that the vertical wall is repositioned to form at least a part of or be disposed adjacent to the floor and the cover is repositioned to form at least a part of or be disposed adjacent to the bulkhead. This reconfiguration serves to eliminate the storage space from within or divide the space defined by the bed.

In a still further illustrative embodiment, the cover is one or more of removable from the bed and retractable to/into the bulkhead and the vertical wall is pivotably attached to the floor, such that, when the cover is removed or retracted, the vertical wall may be pivoted such that the vertical wall is repositioned to form at least a part of or be disposed adjacent to the floor, thereby eliminating the storage space from within or dividing the space defined by the bed.

In a still further illustrative embodiment, the cover is pivotably attached to the bulkhead and the vertical wall is pivotably attached to the floor, such that the cover may be pivoted such that the cover is repositioned to form at least a part of or be disposed adjacent to the bulkhead and the vertical wall may be pivoted such that the vertical wall is repositioned to form at least a part of or be disposed adjacent to the floor. This reconfiguration serves to eliminate the storage space from within or divide the space defined by the bed. When the vertical wall, the cover, the bulkhead, and the floor define the storage space within the space defined by the bed, an edge of the vertical wall contacts an edge of the cover along a sealing line.

In a still further illustrative embodiment, the vertical wall is pivotably attached to the cover, the cover is pivotably attached to the bulkhead, and the vertical wall is pivotably attached to the floor, and the cover includes a front panel pivotably attached to a rear panel, such that the front panel and the rear panel may be partially or wholly collapsed together, reoriented, and un-collapsed when the vertical wall is repositioned to form at least a part of or be disposed adjacent to the floor and the cover is repositioned to form at least a part of or be disposed adjacent to the bulkhead. This reconfiguration serves to eliminate the storage space from within or divide the space defined by the bed.

One or both side walls of the bed define a storage tunnel access opening coincident with the storage space defined by the vertical wall, the cover, the bulkhead, and the floor. One or both side walls of the bed include a door adapted to selectively open and close the associated storage tunnel access opening. An external sealing structure is disposed between the door and an associated side wall and an internal sealing structure is disposed between the door and an edge of one or more of the vertical wall, the cover, the bulkhead, and the floor. Alternatively, the door includes an external door pivotably attached to an internal door, with an external sealing structure disposed between the internal door and an associated side wall, an external sealing structure disposed between the internal door and the external door, and an internal sealing structure disposed between the door and an edge of one or more of the vertical wall, the cover, the bulkhead, and the floor. In this case, the external door and the internal door are pivotably attached to the associated side wall at a lower portion of each of the external door and the internal door and the external door is deployable downwards to form one or more of a storage space extension, a shelf, a seat, and a step.

These aspects are described in greater detail herein below, including equivalent and alternative aspects.

BRIEF DESCRIPTION OF THE DRAWINGS

The present disclosure is illustrated and described herein with reference to the various drawings, in which like reference numbers are used to denote like assembly components/method steps, as appropriate, and in which.

DETAILED DESCRIPTION

The present disclosure provides a relatively large, covered, weatherproof, secure storage compartment that may be selectively deployed within the bed of a pickup truck or other vehicle when desired, and collapsed when a long, flat bed is needed. No heavy, bulky stowage box must be placed, removed, and stored.

The present disclosure provides a storage tunnel assembly for the bed of a pickup truck or other vehicle. The storage tunnel assembly generally includes a deployable vertical wall separated from a bulkhead of the bed and disposed across a width of the bed and a deployable cover separated from a floor of the bed between the vertical wall and the bulkhead and disposed across the width of the bed. The vertical wall, the cover, the bulkhead, and the floor define a storage space within a space defined by the bed. The present disclosure also provides a vehicle utilizing such a storage tunnel assembly and a method for providing such a storage tunnel assembly.

As used herein, "bed" refers to the entirety of the generally long, flat storage space behind the cab or occupant compartment of a pickup truck or other vehicle. This bed is typically includes opposed side walls and a rear tailgate that may be opened/closed and is uncovered or covered with a "temporary" tonneau cover, cap, or the like. While the cab is suitable for seating vehicle occupants, the bed is typically used for storing and carrying cargo. As provided herein, the bed may be single level or have multiple levels, the latter encompassing the floor of a lower storage area disposed just behind the cab of the vehicle, optionally selectively covered by a temporary cover also forming a bed floor, as provided herein. As used herein, "bulkhead" refers to either or both of a rear wall of the cab and a front wall of the bed. This may be a single wall, adjacent walls, or simply a plane that separates the bed from the cab, depending on the context. As used herein, "floor" refers to the bottom wall or surface of any and all parts of the bed or any other structure in its present configuration. This may be a single surface, adjacent surfaces, or simply a plane or planes that form the bottom of the bed behind the cab in the current configuration, depending on the current state of use and context. The floor may occupy one plane on which cargo is disposed in the bed and/or another plane that forms the bottom of the storage compartment of the present disclosure at the time, depending on the current configuration and context. Both are referred to herein as the floor of the bed. Although a storage compartment is provided in the front portion of the bed in the present disclosure, this storage compartment could also be disposed in the rear portion of the bed, with the tailgate substituted for the bulkhead, for example. The storage compartment could also be disposed in the middle portion of the bed, with a fixed or pivoting vertical wall substituted for the bulkhead, for example. Other such variations will be readily apparent to those of ordinary skill in the art.

Figure 1:
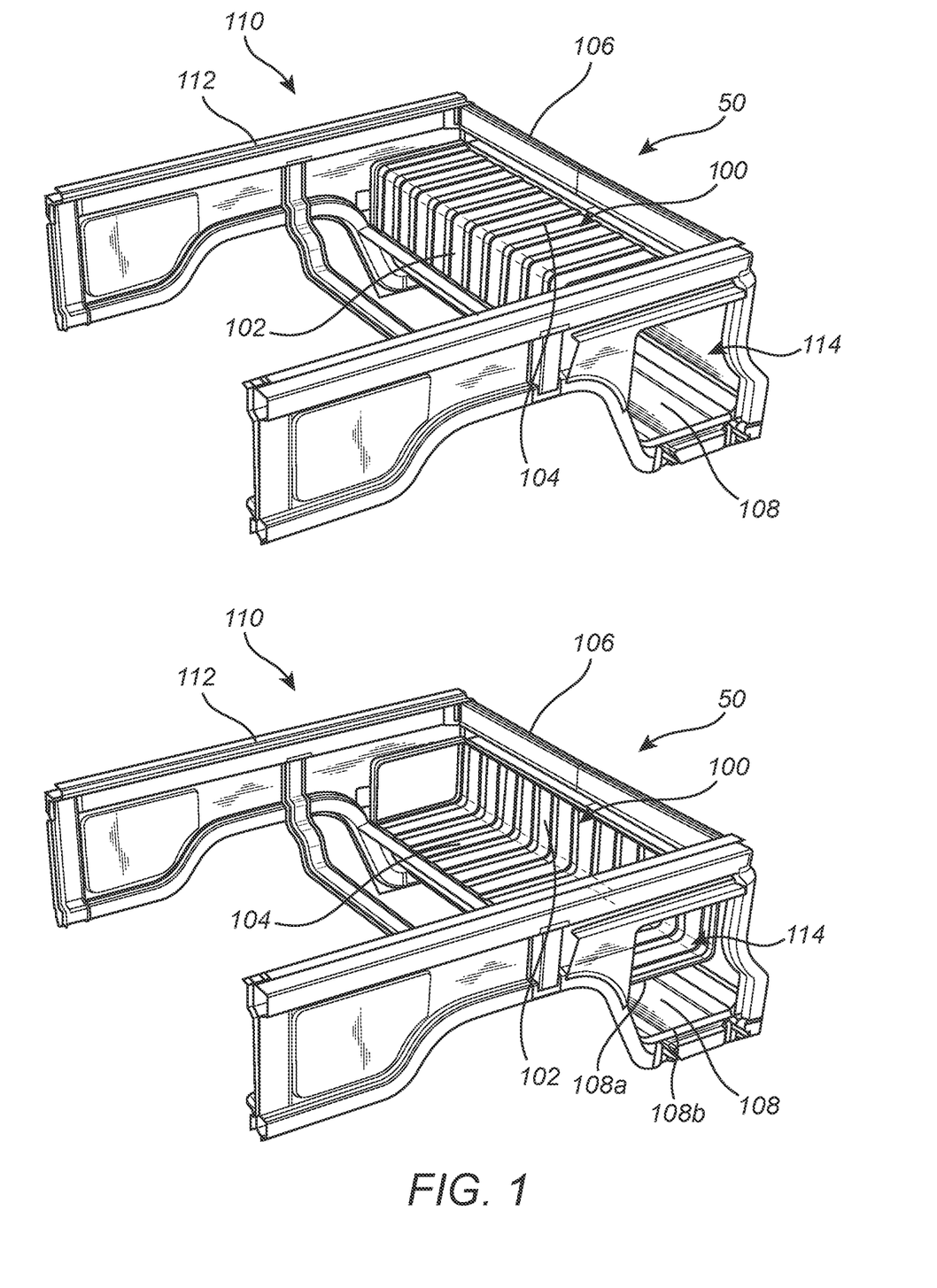
FIG. 1 is a series of perspective views illustrating one embodiment of the storage tunnel assembly of the present disclosure, in both deployed and stowed configurations.

FIG. 1 is a series of perspective views illustrating one embodiment of the storage tunnel assembly 100 of the present disclosure, in both deployed and stowed configurations. In this illustrative embodiment, a vertical wall 102 is rigidly attached to a cover 104 in a substantially perpendicular configuration, such that the vertical wall 102 and the cover 104 form a box structure with the bulkhead 106 and the floor 108, 108b of the front portion of the bed 110 of the vehicle 50 in the deployed configuration. Here, the vertical wall 102 and the cover 104 may both be manufactured from a plastic, fiberglass, a metal, or another suitable substantially rigid material that is watertight and weatherproof. As illustrated, an edge of the vertical wall 102 and an edge of the cover 104 meet at a substantially right angle, but a radius of curvature, intervening angle, and/or another angle may be utilized equally. Here, this mating angle is fixed, such that the vertical wall 102 and the cover 104 form a single structure. In an alternative embodiment, the vertical wall 102 and the cover 104 may be separate structures that are simply disposed adjacent to and abutting one another as is illustrated and described. The vertical wall 102 and the cover 104 may be collectively rotated or separately repositioned such that the vertical wall 102 is repositioned (from rearwards in the bed 110 to frontwards in the bed 110) to form at least a part of or be disposed adjacent to the bulkhead 106 and the cover 104 is repositioned (from the top of the bed 110 to the bottom of the bed 110) to form at least a part of the floor 108a or be disposed adjacent to the floor 108, as is illustrated. This reconfiguration serves to eliminate the storage space from within or divide the space defined by the bed 110, optionally forming a reduced storage space below the resulting upper floor 108a of the bed 110, with the bottom of the reduced storage space now being a lower floor 108b of the bed 110. In this configuration, adjacent parallel floors 108a (formed by the cover 104), and 108b (formed by the structure of the bed 110) are provided and define the reduced storage space.

When the storage tunnel assembly 100 is deployed, a lower edge of the vertical wall 102 may be disposed within a slot or against a lip defined by the floor 108 of the bed 110 and a front edge of the cover 104 may be disposed within a slot or against a lip defined by the bulkhead 106 of the bed 110. These retention structures may include appropriate sealing structures, such as gaskets or the like, to effectively seal the resulting storage compartment, and any suitable releasable retention mechanisms may be used to hold the vertical wall 102 and the cover 104 secure in the deployed configuration. Such releasable retention mechanisms are well known to those of ordinary skill in the art and are not described in greater detail herein. Likewise, when the storage tunnel assembly 100 is stowed, the lower (now upper) edge of the vertical wall 102 may be disposed within the slot or against the lip defined by the bulkhead 106 of the bed 110 and the front (now rear) edge of the cover 104 may be disposed within the slot or against the lip defined by the 108 of the bed 110. These retention structures may again include appropriate sealing structures, such as gaskets or the like, to effectively seal the collapsed storage compartment, and any suitable releasable retention mechanisms may be used to hold the vertical wall 102 and the cover 104 secure in the stowed configuration. When stowed, the vertical wall 102 forms part of the bulkhead 106 of the bed 110 and the cover 104 forms part of the floor 108a of the bed 110, providing a long, flat bed 110 without the presence of a storage compartment, optionally forming a reduced storage space below the resulting upper floor 108a of the bed 110, with the bottom of the reduced storage space now being a lower floor 108b of the bed 110.

One or both side walls 112 of the bed 110 define a storage tunnel access opening 114 coincident with the storage space defined by the vertical wall 102, the cover 104, the bulkhead 106, and the floor 108 in the deployed configuration. One or both side walls 112 of the bed 110 also include a door (not illustrated in FIG. 1) adapted to selectively open and close the associated storage tunnel access opening 114. Each door may be deployable pivotably downwards to a substantially horizontal alignment to form one or more of a storage space extension, a shelf, a seat, and a step. Each door may also be deployable pivotably sideways or upwards, if desired. This arrangement generally provides external vehicle access to the storage compartment from one or both sides of the bed 110. Although not illustrated in FIG. 1, an access hatch and/or access door may also be provided to the storage compartment from the cab through the bulkhead 106.

It should be noted that, the floor 108b of the bed 110 in the area of the storage compartment may be lower than the floor 108 of the bed 110 in the rearwards portion of the bed 110, such that the storage compartment has a maximized internal volume in the deployed configuration. In such case, in the stowed configuration, the cover 104 forms a portion of the floor 108a of the bed 110 that is substantially coplanar with the floor 108 of the bed 110 in the rearwards portion of the bed 110. This essentially bifurcates the storage compartment and leaves a reduced storage compartment under the floor 108a of the bed 110 formed by the cover 104 that may be accessed via the storage tunnel access opening(s) 114 and door(s) even when a long, flat bed 110 is provided in the stowed configuration. In this sense, the cover 104 forms a false floor 108a of the bed 110 in the stowed configuration, maintaining a convenient, reduced storage compartment for things like skis, etc. In such a case, it may be desirable to utilize a bifurcated door, including a lower portion that pivots sideways or downwards, for example, and corresponds only to the reduced storage compartment, and including an upper portion that pivots sideways or upwards, for example, and corresponds only to the remainder of the deployed, expanded storage compartment. Each portion of the storage compartment may occupy any available internal volume that the various surrounding vehicle structures allow, as dictated by storage volume maximization versus structural integrity.

In another illustrative embodiment, the vertical wall 102 is pivotably attached to the cover 104, such that the vertical wall 102 and the cover 104 may be expanded apart to form the deployed structure illustrated in FIG. 1, partially or wholly collapsed together, collectively rotated, and again expanded apart such that the vertical wall 102 is repositioned to form at least a part of or be disposed adjacent to the bulkhead 106 and the cover 104 is repositioned to form at least a part of or be disposed adjacent to the floor 108, forming the stowed structure illustrated in FIG. 1. This reconfiguration again serves to partially or wholly eliminate the storage space from within or divide the space defined by the bed 110, as is provided herein above.

Figure 2:
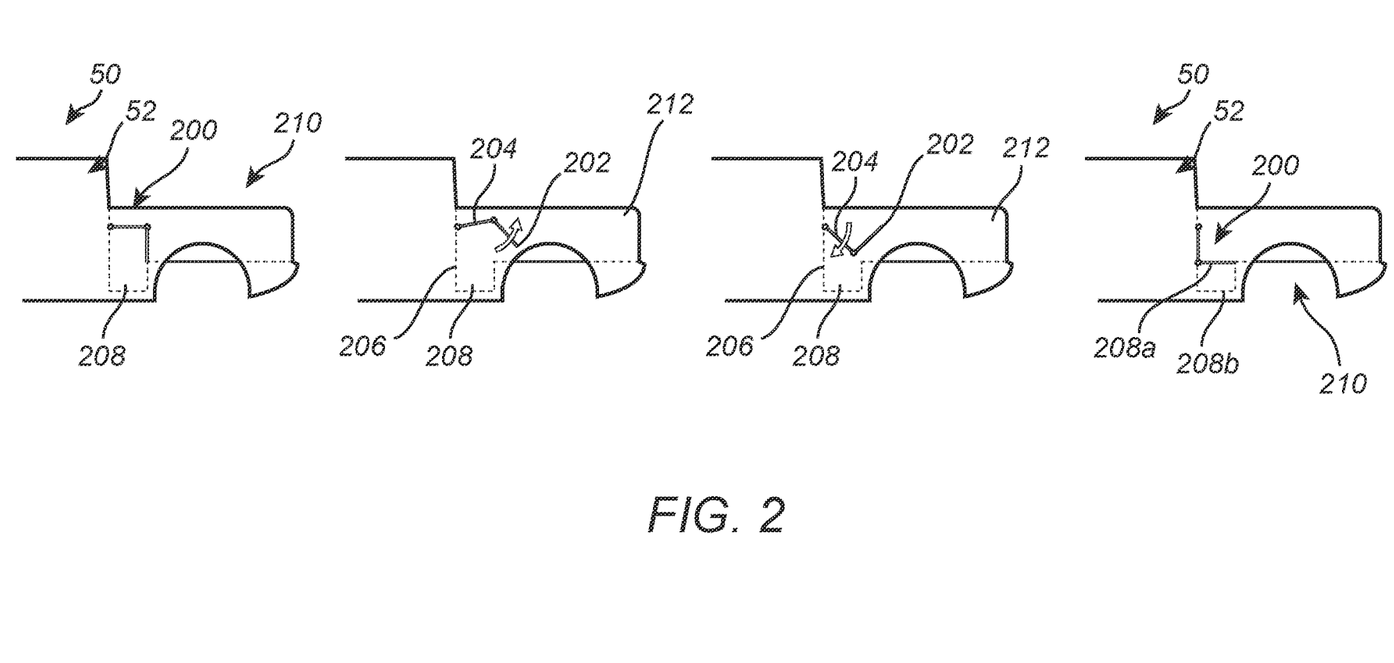
FIG. 2 is a series of planar side views illustrating another embodiment of the storage tunnel assembly of the present disclosure, in deployed, intermediate, and stowed configurations.

FIG. 2 is a series of planar side views illustrating another embodiment of the storage tunnel assembly 200 of the present disclosure, in deployed, intermediate, and stowed configurations. In this illustrative embodiment, the vertical wall 202 is pivotably attached to the cover 204 and either the cover 204 is pivotably attached to the bulkhead 206 or the vertical wall 202 is pivotably attached to the floor 208, providing a single, pivotable point of attachment of both components to the vehicle 50. In the embodiment illustrated, the cover 204 is pivotably attached to the bulkhead 206, while the vertical wall 202 is pivotably attached to the cover 204, by way of example. Thus, starting in the deployed configuration, the vertical wall 202 and the cover 204 may be partially or wholly collapsed together, reoriented, and un-collapsed such that the vertical wall 202 is repositioned to form at least a part of or be disposed adjacent to the floor 208 and the cover 204 is repositioned to form at least a part of or be disposed adjacent to the bulkhead 206. This reconfiguration again serves to eliminate the storage space from within or divide the space defined by the bed 210, optionally forming a reduced storage space below the resulting upper floor 208a of the bed 210, with the bottom of the reduced storage space now being a lower floor 208b of the bed 210.

In the deployed configuration, the vertical wall 202 is disposed substantially perpendicular to the cover 204 (or at another predetermined angle), such that the vertical wall 202 and the cover 204 form the box structure with the bulkhead 206 and the floor 208 of the front portion of the bed 210 of the vehicle 50. Again, the vertical wall 202 and the cover 204 may both be manufactured from a plastic, fiberglass, a metal, or another suitable substantially rigid material that is watertight and weatherproof.

When the storage tunnel assembly 200 is deployed, a lower edge of the vertical wall 202 may be disposed within a slot or against a lip defined by the floor 208 of the bed 210 and a watertight/weatherproof hinge may be utilized at the front edge of the cover 204. The retention structure may include an appropriate sealing structure, such as gasket or the like, to effectively seal the resulting storage compartment, and any suitable releasable retention mechanisms may be used to hold the vertical wall 202 in the deployed configuration. Such releasable retention mechanisms are well known to those of ordinary skill in the art and are not described in greater detail herein. If the vertical wall 204 is pivotably attached to the floor 208 instead, a front edge of the cover 204 may be disposed within a slot or against a lip defined by the bulkhead 206 of the bed 210 and a watertight/weatherproof hinge may be utilized at the lower edge of the vertical wall 202. The retention structure may again include an appropriate sealing structure, such as gasket or the like, to effectively seal the resulting storage compartment, and any suitable releasable retention mechanisms may be used to hold the cover 204 in the deployed configuration. Likewise, in the embodiment illustrated, when the storage tunnel assembly 200 is stowed, the lower edge of the vertical wall 202 may be disposed within the slot or against the lip defined by the floor 208 of the bed 210. This retention structure may again include an appropriate sealing structure, such as a gasket or the like, to effectively seal the collapsed storage compartment, and any suitable releasable retention mechanisms may be used to hold the vertical wall 202 secure in the stowed configuration. When stowed, the vertical wall 202 forms part of the floor 208a of the bed 210 and the cover 204 forms part of the bulkhead 206 of the bed 210, providing a long, flat bed 210 without the presence of a storage compartment.

Although not illustrated in FIG. 2, one or both side walls 212 of the bed 210 again define a storage tunnel access opening 114 (FIG. 1) coincident with the storage space defined by the vertical wall 202, the cover 204, the bulkhead 206, and the floor 208 in the deployed configuration. One or both side walls 212 of the bed 210 also include a door (not illustrated in FIG. 2) adapted to selectively open and close the associated storage tunnel access opening 114. Each door may be deployable pivotably downwards to a substantially horizontal alignment to form one or more of a storage space extension, a shelf, a seat, and a step. Each door may also be deployable pivotably sideways or upwards, if desired. This arrangement generally provides external vehicle access to the storage compartment from one or both sides of the bed 210. Although not illustrated in FIG. 2, an access hatch and/or access door may also be provided to the storage compartment from the cab 52 through the bulkhead 206.

It should again be noted that, the floor 208b of the bed 210 in the area of the storage compartment may be lower than the floor 208 of the bed 210 in the rearwards portion of the bed 210, such that the storage compartment has a maximized internal volume in the deployed configuration. In such case, in the stowed configuration, the vertical wall 202 forms a portion of the floor 208a of the bed 210 that is substantially coplanar with the floor 208 of the bed 210 in the rearwards portion of the bed 210. This essentially bifurcates the storage compartment and leaves a reduced storage compartment under the floor 208a of the bed 210 formed by the vertical wall 202 that may be accessed via the storage tunnel access opening(s) 114 and door(s) even when a long, flat bed 210 is provided in the stowed configuration. In this sense, the vertical wall 202 forms a false floor 208a of the bed 210 in the stowed configuration, maintaining a convenient, reduced storage compartment for things like skis, etc. In such a case, it may be desirable to utilize a bifurcated door, including a lower portion that pivots sideways or downwards, for example, and corresponds only to the reduced storage compartment, and including an upper portion that pivots sideways or upwards, for example, and corresponds only to the remainder of the deployed, expanded storage compartment. Each portion of the storage compartment may occupy any available internal volume that the various surrounding vehicle structures allow, as dictated by storage volume maximization versus structural integrity.

Figure 3:
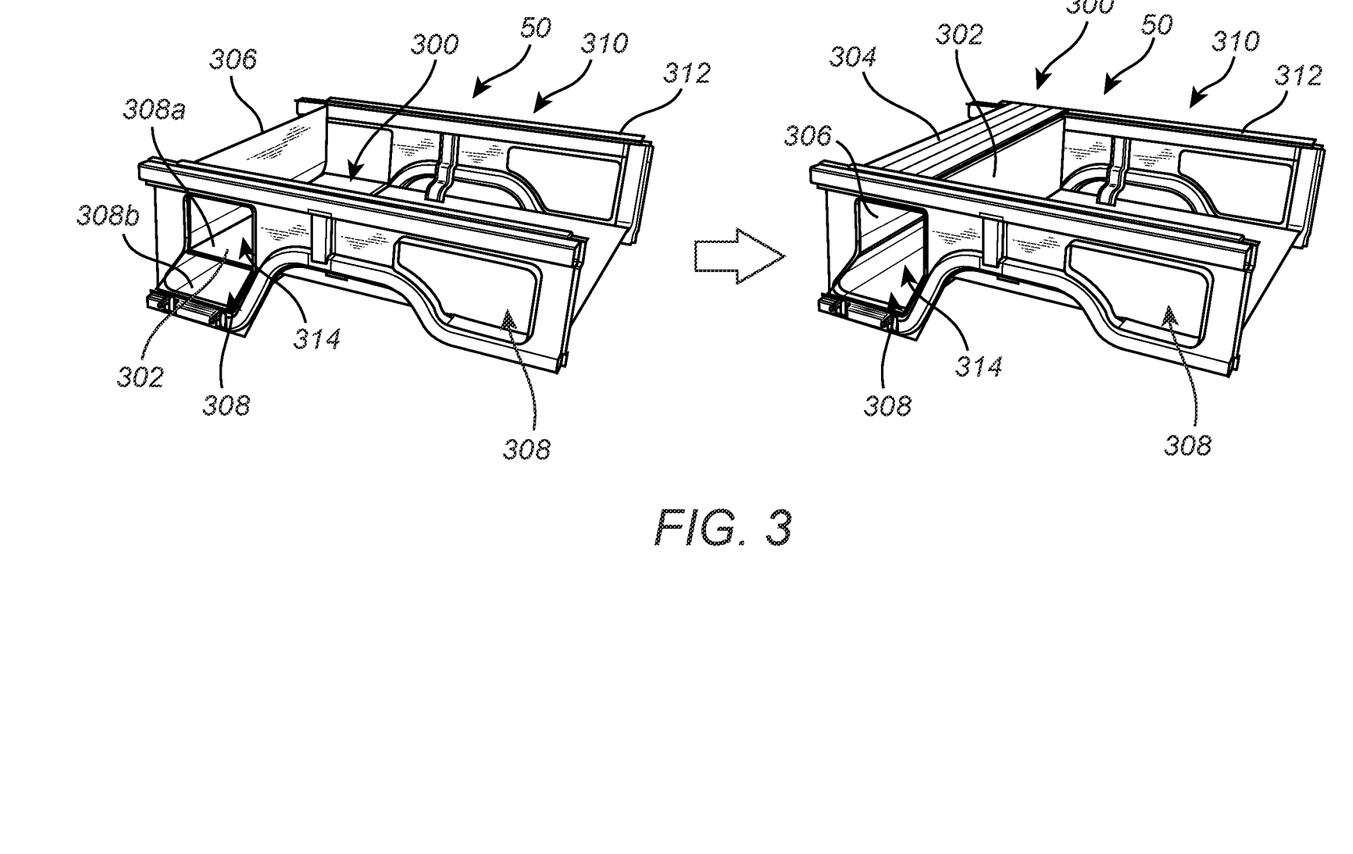
FIGS. 3 and 4 are a series of perspective views illustrating a further embodiment of the storage tunnel assembly of the present disclosure, in deployed and stowed configurations.
Figure 4:
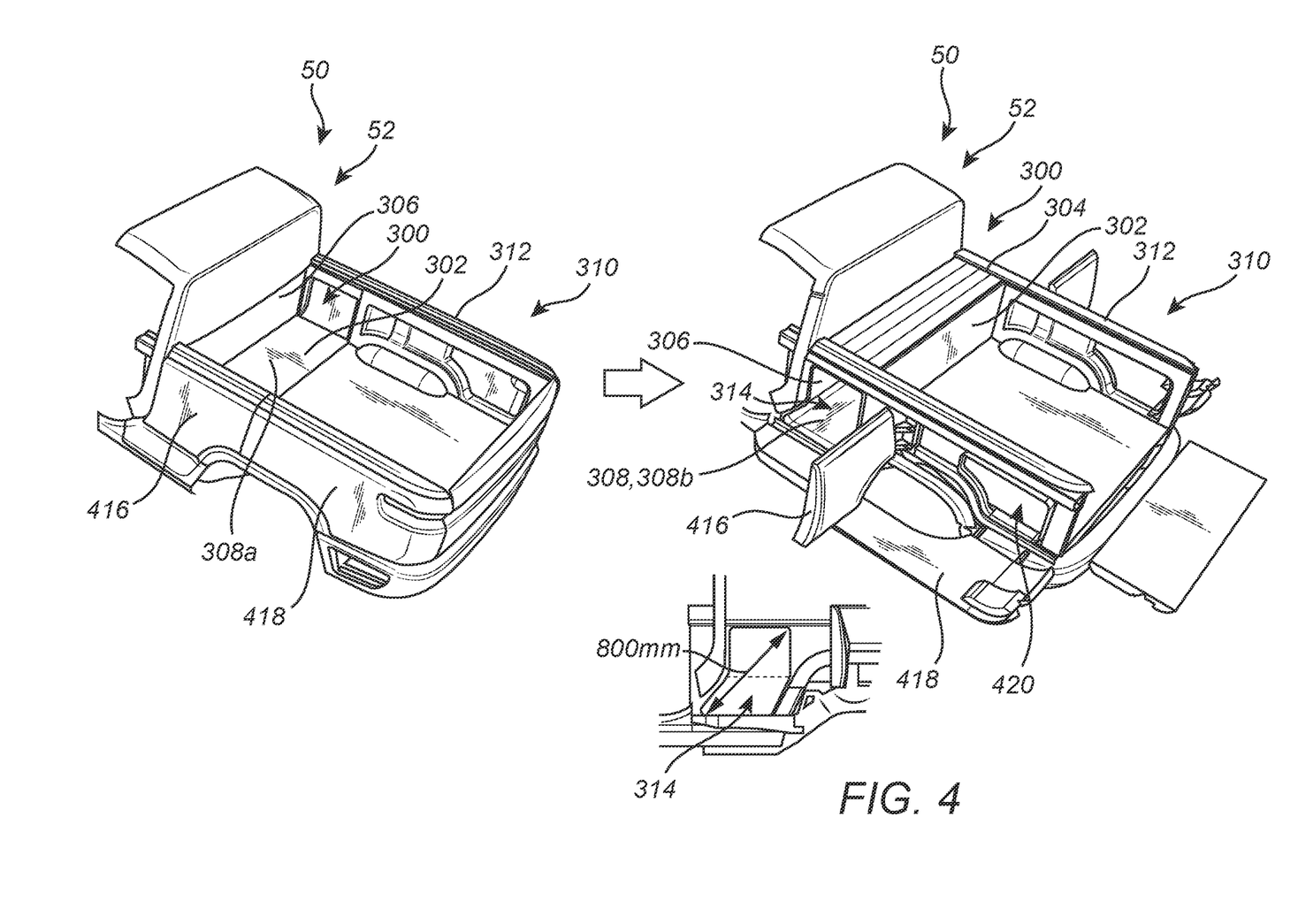

FIGS. 3 and 4 are a series of perspective views illustrating a further embodiment of the storage tunnel assembly 300 of the present disclosure, in deployed and stowed configurations. In this illustrative embodiment, the cover 304 is removable from the bed 310 and the vertical wall 302 is pivotably attached to the floor 308, such that, when the cover 304 is removed, the vertical wall 302 may be pivoted such that the vertical wall 302 is repositioned to form at least a part of or be disposed adjacent to the floor 308. This reconfiguration again serves to eliminate the storage space from within or divide the space defined by the bed 310. Thus, starting in the deployed configuration, the cover 304 may be removed and the vertical wall 302 may be pivoted and repositioned to form at least a part of or be disposed adjacent to the floor 308. This reconfiguration again serves to eliminate the storage space from within or divide the space defined by the bed 310, optionally forming a reduced storage space below the resulting upper floor 308a of the bed 310, with the bottom of the reduced storage space now being a lower floor 308b of the bed 310.

As an alternative, in this embodiment, the cover may be a short tonneau cover or a portion of a conventional, full-size tonneau cover that deploys from and is retracted to/into the bulkhead 306. Thus, the cover 304 may be a slatted metal/plastic roller-type cover, a cassette-type retracting cover, or a rolled-cloth cover, all of which are known to those of ordinary skill in the art. Thus, instead of being placed and removed, the cover 304 is deployed from and retracted to/into the bulkhead 306.

In the deployed configuration, the vertical wall 302 is disposed substantially perpendicular to the cover 304 (or at another predetermined angle), such that the vertical wall 302 and the cover 304 form the box structure with the bulkhead 306 and the floor 308b of the front portion of the bed 310 of the vehicle 50. Again, the vertical wall 302 and the cover 304 may both be manufactured from a plastic, fiberglass, a metal, or another suitable substantially rigid material that is watertight and weatherproof. Here, due to its removability, it may be desirable to manufacture the cover 304 as a tonneau cover or the like using a relatively lighter weight material. In all embodiments, it is important that the component forming a portion of the floor 308a (the vertical wall 302 in this case) in the stowed configuration has sufficient rigidity that it can support cargo and the like in the bed 310 without deflecting significantly or deforming.

When the storage tunnel assembly 300 is deployed, a front edge of the cover 304 may be disposed within a slot or against a lip defined by the bulkhead 306 of the bed 310 and a watertight/weatherproof hinge may be utilized at the lower edge of the vertical wall 302. The retention structure may include an appropriate sealing structure, such as gasket or the like, to effectively seal the resulting storage compartment, and any suitable releasable retention mechanisms may be used to hold the vertical wall 302 and the cover 304 in the deployed configuration. Such releasable retention mechanisms are well known to those of ordinary skill in the art and are not described in greater detail herein. Here, a watertight/weatherproof seal is provided between the upper edge of the vertical wall 302 and the rear edge of the cover 304, and releasable retention mechanisms may be used in this location as well. When the storage tunnel assembly 300 is stowed, the upper edge of the vertical wall 302 may be disposed within a slot or against a lip defined by the bulkhead 306 and/or the floor 308 of the bed 310. This retention structure may again include an appropriate sealing structure, such as a gasket or the like, to effectively seal the collapsed storage compartment, and any suitable releasable retention mechanisms may be used to hold the vertical wall 302 secure in the stowed configuration. When stowed, the vertical wall 302 forms part of the floor 308a of the bed 310 and the cover 304 is stored elsewhere on or apart from the vehicle 50, providing a long, flat bed 310 without the presence of a storage compartment. In terms of storage when not in use, the cover 304 may be stored within the reduced storage compartment remaining under the floor 308a formed by the vertical wall 302 or elsewhere in or under the vehicle 50.

One or both side walls 312 of the bed 310 again define a storage tunnel access opening 314 coincident with the storage space defined by the vertical wall 302, the cover 304, the bulkhead 306, and the floor 308 in the deployed configuration. One or both side walls 312 of the bed 310 also include a door 416 (FIG. 4) adapted to selectively open and close the associated storage tunnel access opening 314. Each door 416 may be deployable pivotably downwards to a substantially horizontal alignment to form one or more of a storage space extension, a shelf, a seat, and a step. Each door 416 may also be deployable pivotably sideways (as illustrated in FIG. 4) or upwards, if desired. This arrangement generally provides external vehicle access to the storage compartment from one or both sides of the bed 310. Although not illustrated in FIG. 3 or 4, an access hatch and/or access door may also be provided to the storage compartment from the cab 52 through the bulkhead 306.

It should again be noted that, the floor 308b of the bed 310 in the area of the storage compartment may be lower than the floor 308 of the bed 310 in the rearwards portion of the bed 310, such that the storage compartment has a maximized internal volume in the deployed configuration. In such case, in the stowed configuration, the vertical wall 302 forms a portion of the floor 308a of the bed 310 that is substantially coplanar with the floor 308 of the bed 310 in the rearwards portion of the bed 310. This essentially bifurcates the storage compartment and leaves a reduced storage compartment under the floor 308a of the bed 310 formed by the vertical wall 302 that may be accessed via the storage tunnel access opening(s) 314 and door(s) 316 even when a long, flat bed 310 is provided in the stowed configuration. In this sense, the vertical wall 302 forms a false floor 308a of the bed 310 in the stowed configuration, maintaining a convenient, reduced storage compartment for things like skis, etc. In such a case, it may be desirable to utilize a bifurcated door 416, including a lower portion that pivots sideways or downwards, for example, and corresponds only to the reduced storage compartment, and including an upper portion that pivots sideways or upwards, for example, and corresponds only to the remainder of the deployed, expanded storage compartment. Each portion of the storage compartment may occupy any available internal volume that the various surrounding vehicle structures allow, as dictated by storage volume maximization versus structural integrity.

FIG. 4 also illustrates a deployable exterior bed side panel 418 that provides selective interior access to a side wall 312 of the vehicle 50 and may provide access to a pass-through 420 into the bed 310. It should be noted that, when the vertical wall 302 is stowed, the door(s) 316 of the bed 310 simply provide side access to/through the bed 310.

Figure 5:
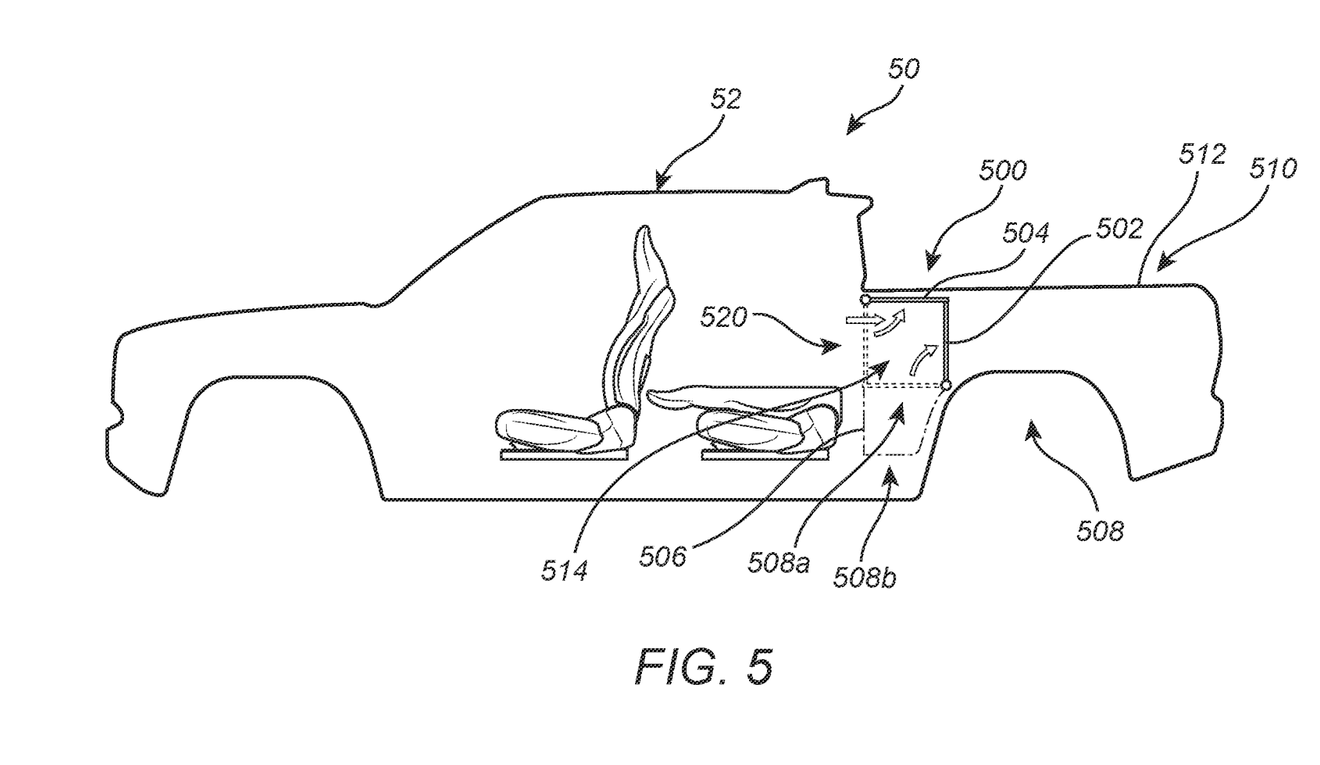
FIG. 5 is a planar side view illustrating a still further embodiment of the storage tunnel assembly of the present disclosure, in a deployed configuration.

FIG. 5 is a planar side view illustrating a still further embodiment of the storage tunnel assembly 500 of the present disclosure, in a deployed configuration. In this illustrative embodiment, the vertical wall 502 is pivotably attached to the floor 508 and the cover 504 is pivotably attached to the bulkhead 506. Thus, starting in the deployed configuration and ending in the stowed configuration, the vertical wall 202 may be collapsed to form a portion of the floor 508a adjacent to the cab 52 of the vehicle 50, above a remaining portion of the storage compartment and the lower portion of the floor 508b thereof, while the cover 504 may be collapsed to form a portion of the bulkhead 506 adjacent to the cab 52 of the vehicle. This reconfiguration again serves to eliminate the storage space from within or divide the space defined by the bed 510, forming a reduced storage space below the resulting upper floor 508a of the bed 510, with the bottom of the reduced storage space now being the lower floor 508b of the bed 510.

In the deployed configuration, the vertical wall 502 is disposed substantially perpendicular to the cover 504 (or at another predetermined angle), such that the vertical wall 502 and the cover 504 form the box structure with the bulkhead 506 and the floor 508b of the front portion of the bed 510 of the vehicle 50. Again, the vertical wall 502 and the cover 504 may both be manufactured from a plastic, fiberglass, a metal, or another suitable substantially rigid material that is watertight and weatherproof.

When the storage tunnel assembly 500 is deployed, the free ends of the vertical wall 502 and the cover 504 may meet along an intersection line that includes an appropriate sealing structure, such as gasket or the like, to effectively seal the resulting storage compartment, and any suitable releasable retention mechanisms may be used to hold the vertical wall 502 and the cover 504 in the deployed configuration. Such releasable retention mechanisms are well known to those of ordinary skill in the art and are not described in greater detail herein. When stowed, the vertical wall 502 forms part of the floor 508a of the bed 510 and the cover 504 forms part of the bulkhead 506 of the bed 510, providing a long, flat bed 210 without the presence of a storage compartment and a small storage compartment underneath the floor 508a of the bed 510.

Although not fully illustrated in FIG. 5, one or both side walls 512 of the bed 510 again define a storage tunnel access opening 514 coincident with the storage space defined by the vertical wall 502, the cover 504, the bulkhead 506, and the floor 508b in the deployed configuration. One or both side walls 512 of the bed 510 also include a door (not illustrated in FIG. 5) adapted to selectively open and close the associated storage tunnel access opening 514. Each door may be deployable pivotably downwards to a substantially horizontal alignment to form one or more of a storage space extension, a shelf, a seat, and a step. Each door may also be deployable pivotably sideways or upwards, if desired. This arrangement generally provides external vehicle access to the storage compartment from one or both sides of the bed 510. An access passthrough, access hatch and/or access door 520 may also be provided to the storage compartment from the cab 52 through the bulkhead 506.

It should again be noted that, the floor 508b of the bed 510 in the area of the storage compartment may be lower than the floor 508 of the bed 510 in the rearwards portion of the bed 510, such that the storage compartment has a maximized internal volume in the deployed configuration. In such case, in the stowed configuration, the vertical wall 502 forms a portion of the floor 508a of the bed 510 that is substantially coplanar with the floor 508 of the bed 510 in the rearwards portion of the bed 510. This essentially bifurcates the storage compartment and leaves a reduced storage compartment under the floor 508a of the bed 510 formed by the vertical wall 502 that may be accessed via the storage tunnel access opening(s) 514 and door(s) even when a long, flat bed 510 is provided in the stowed configuration. In this sense, the vertical wall 502 forms a false floor 508a of the bed 510 in the stowed configuration, maintaining a convenient, reduced storage compartment for things like skis, etc. In such a case, it may be desirable to utilize a bifurcated door, including a lower portion that pivots sideways or downwards, for example, and corresponds only to the reduced storage compartment, and including an upper portion that pivots sideways or upwards, for example, and corresponds only to the remainder of the deployed, expanded storage compartment. Each portion of the storage compartment may occupy any available internal volume that the various surrounding vehicle structures allow, as dictated by storage volume maximization versus structural integrity.

Figure 6:
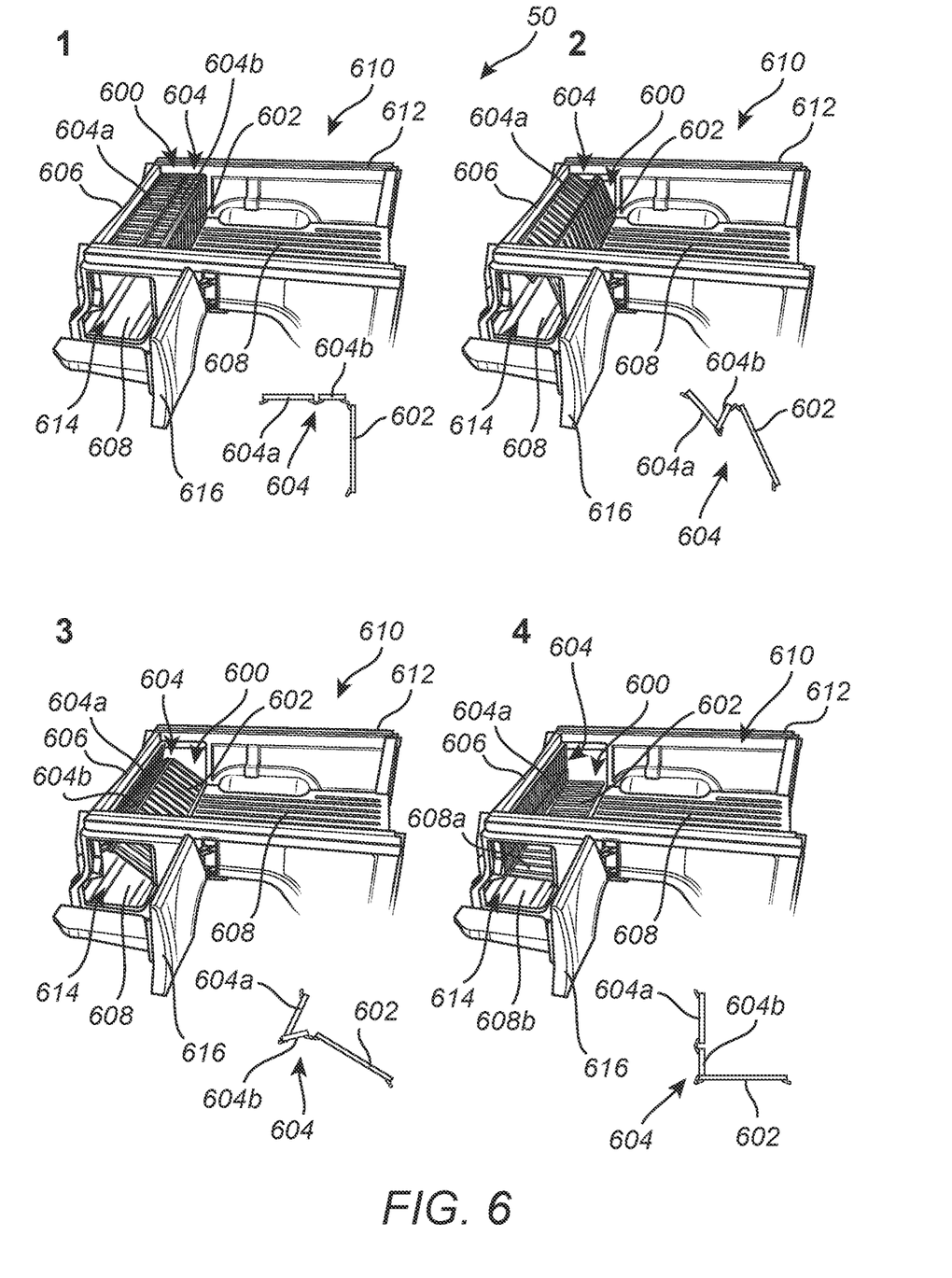
FIG. 6 is a series of perspective views illustrating a still further embodiment of the storage tunnel assembly of the present disclosure, in deployed, intermediate, and stowed configurations.

FIG. 6 is a series of perspective views illustrating a still further embodiment of the storage tunnel assembly 600 of the present disclosure, in deployed, intermediate, and stowed configurations. In this illustrative embodiment, the vertical wall 602 is pivotably attached to the cover 604, the cover 604 is pivotably attached to the bulkhead 606, and the vertical wall 602 is pivotably attached to the floor 608, and the cover 604 includes a front panel 604*a* pivotably attached to a rear panel 604*b*, such that the front panel 604*a* and the rear panel 604*b* may be partially or wholly collapsed together, reoriented, and un-collapsed when the vertical wall 602 is repositioned to form at least a part of or be disposed adjacent to the floor 608 and the cover 604 is repositioned to form at least a part of or be disposed adjacent to the bulkhead 606. It will be readily apparent to those of ordinary skill in the art that additional cover panels may be used as well. This reconfiguration again serves to eliminate the storage space from within or divide the space defined by the bed 610, optionally forming a reduced storage space below the resulting upper floor 608*a* of the bed 610, with the bottom of the reduced storage space now being a lower floor 608*b* of the bed 610. Here, all pivotable connections are also preferably watertight and weatherproof, remaining joined and sealed at all times to prevent water and debris from entering the stowage area.

In the deployed configuration, the vertical wall 602 is disposed substantially perpendicular to the cover 604 (or at another predetermined angle), such that the vertical wall 602 and the cover 604 form the box structure with the bulkhead 606 and the floor 608*b* of the front portion of the bed 610 of the vehicle 50. Again, the vertical wall 602 and the cover 604 may both be manufactured from a plastic, fiberglass, a metal, or another suitable substantially rigid material that is watertight and weatherproof. All pivotable connections are also preferably watertight and weatherproof. The box structure of the deployed configuration may be held rigid by any number of releasable retention mechanisms associated with any of the various components/pivotable connections. When stowed, the vertical wall 602 forms part of the floor 608*a* of the bed 610 and the cover 604 forms part of the bulkhead 606 of the bed 610, providing a long, flat bed 610 without the presence of a storage compartment, with the exception of a reduced storage compartment potentially being present below the now deployed vertical wall 602/floor 608*a* of the bed 610.

One or both side walls 612 of the bed 610 again define a storage tunnel access opening 614 coincident with the storage space defined by the vertical wall 602, the cover 604, the bulkhead 606, and the floor 608 in the deployed configuration. One or both side walls 612 of the bed 610 also include a door 616 adapted to selectively open and close the associated storage tunnel access opening 614. Each door 616 may be deployable pivotably downwards to a substantially horizontal alignment to form one or more of a storage space extension, a shelf, a seat, and a step. Each door may also be deployable pivotably sideways (as is illustrated in FIG. 6) or upwards, if desired. This arrangement generally provides external vehicle access to the storage compartment from one or both sides of the bed 610. Although not illustrated in FIG. 6, an access hatch and/or access door may also be provided to the storage compartment from the cab through the bulkhead 606.

It should again be noted that, the floor 608*b* of the bed 610 in the area of the storage compartment may be lower than the floor 608 of the bed 610 in the rearwards portion of the bed 610, such that the storage compartment has a maximized internal volume in the deployed configuration. In such case, in the stowed configuration, the vertical wall 602 forms a portion of the floor 608*a* of the bed 610 that is substantially coplanar with the floor 608 of the bed 610 in the rearwards portion of the bed 610. This essentially bifurcates the storage compartment and leaves a reduced storage compartment under the floor 608*a* of the bed 610 formed by the vertical wall 602 that may be accessed via the storage tunnel access opening(s) 614 and door(s) 616 even when a long, flat bed 610 is provided in the stowed configuration. In this sense, the vertical wall 602 forms a false floor 608*a* of the bed 610 in the stowed configuration, maintaining a convenient, reduced storage compartment for things like skis, etc. In such a case, it may be desirable to utilize a bifurcated door, including a lower portion that pivots sideways or downwards, for example, and corresponds only to the reduced storage compartment, and including an upper portion that pivots sideways or upwards, for example, and corresponds only to the remainder of the deployed, expanded storage compartment. Each portion of the storage compartment may occupy any available internal volume that the various surrounding vehicle structures allow, as dictated by storage volume maximization versus structural integrity.

Figure 7:
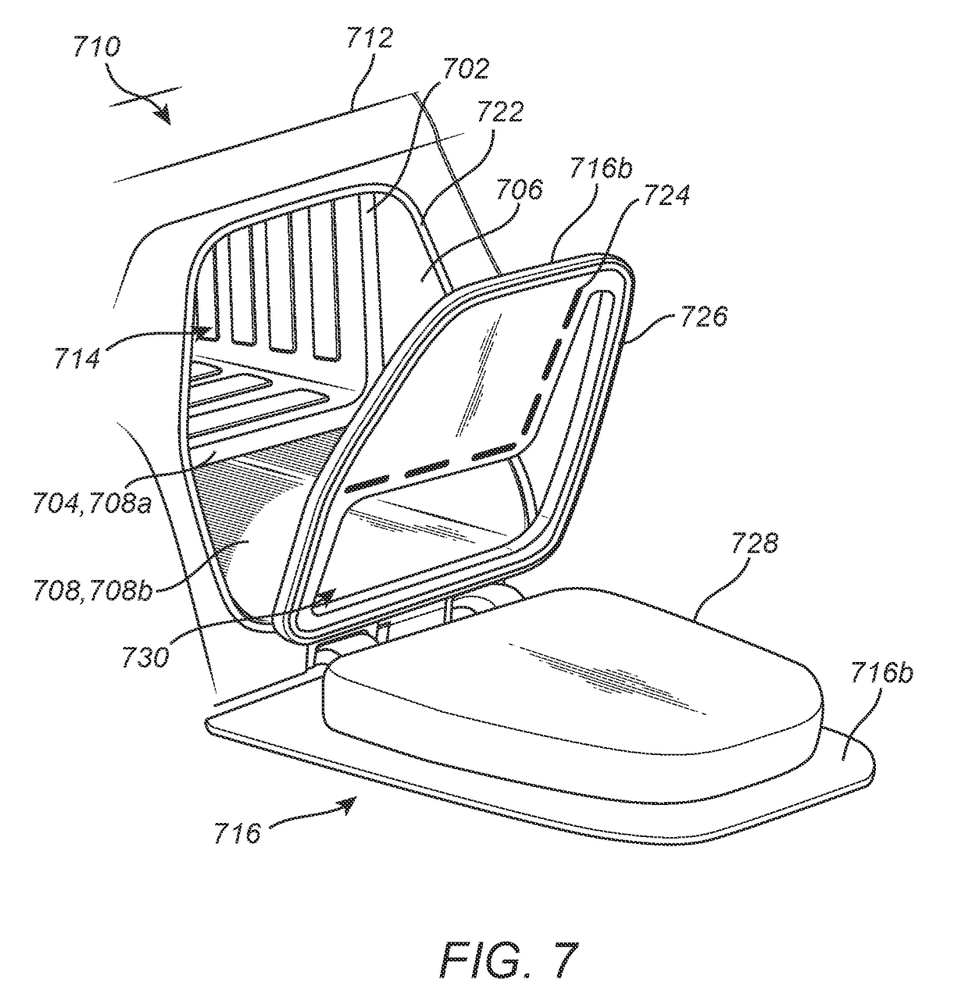
FIG. 7 is a perspective view illustrating one embodiment of a storage tunnel door of the present disclosure, in a deployed configuration.

FIG. 7 is a perspective view illustrating one embodiment of a storage tunnel door 716 of the present disclosure, in a deployed configuration. One or both side walls 712 of the bed 710 define storage tunnel access opening(s) 714 coincident with the storage space(s) defined by the vertical wall 702, the cover 704, the bulkhead 716, and the floor(s) 708 (708*a* and 708*b*) in any of the above embodiments and configurations. One or both side walls 712 of the bed 710 include a door 716 adapted to selectively open and close the associated storage tunnel access opening(s) 714. An external sealing structure 722 is disposed between the door 716 and an associated side wall 712 and an internal sealing structure 724 is disposed between the door 716 and an edge of one or more of the vertical wall 702, the cover 704, the bulkhead 706, and the floor(s) 708 in selected of the above embodiments and configurations. Alternatively, the door 716 includes an external door 716*a* pivotably attached to an internal door, 716*b* with the external sealing structure 722 disposed between the internal door 716*b* and the associated side wall 712, an external sealing structure 726 disposed between the internal door 716*b* and the external door 716*a*, and the internal sealing structure 724 disposed between the door 716 and an edge of the one or more of the vertical wall 702, the cover 704, the bulkhead 706, and the floor(s) 708 in the selected of the above embodiments and configurations. In this case, the external door 716*a* and the internal door 716*b* are pivotably attached to the associated side wall 712 at a lower portion of each of the external door 716*a* and the internal door 716*b* and the external door 716*a* is deployable downwards to form one or more of a storage space extension, a shelf, a seat, and a step. A cushion 728 may be provided on the internal surface of the external door 716*a* for seating purposes.

The internal door 716*b* may include one or more cutouts 730 such that, when the internal door 716*b* is closed and the external door 716*a* is open, with the storage space bifurcated by a stowed storage tunnel assembly 100, 200, 300, 400, 500, 600, for example, the bed 710 may remain closed through the corresponding access opening 714, while the reduced storage space open through the cutout(s) 730 and the corresponding access opening 714. Thus, two variable coverage doors 716 are provided in a single assembly, providing opening/closure variability corresponding to the various storage tunnel assembly configurations.

Figure 8:
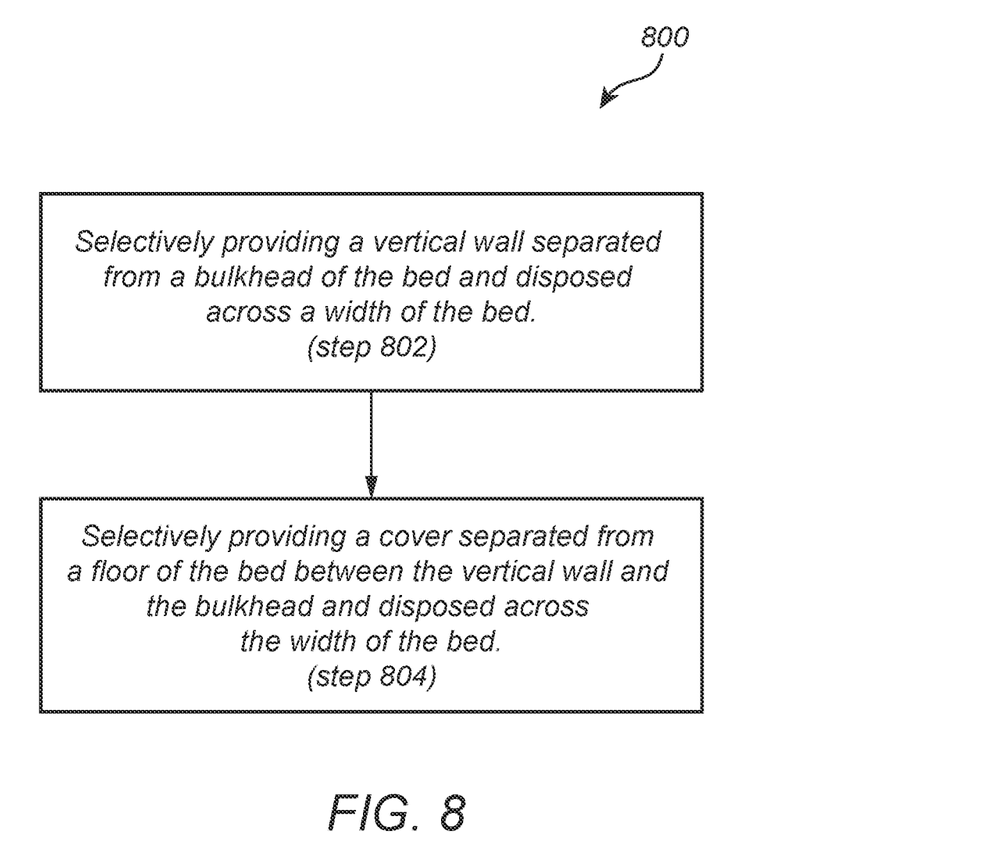
FIG. 8 is a flowchart illustrating one embodiment of a method for selectively providing a storage tunnel assembly for a bed of a pickup truck or other vehicle using any of the reconfigurable assemblies provided herein.

FIG. 8 is a flowchart illustrating one embodiment of a method 800 for selectively providing a storage tunnel assembly for a bed of a pickup truck or other vehicle using any of the reconfigurable assemblies 100, 200, 300, 400, 500, 600 provided herein. The method 800 generally includes selectively providing a vertical wall separated from a bulkhead of the bed and disposed across a width of the bed (step 802) and selectively providing a cover separated from a floor of the bed between the vertical wall and the bulkhead and disposed across the width of the bed (step 804). The vertical wall, the cover, the bulkhead, and the floor resultingly define a storage space within a space defined by the bed.

Although the present disclosure is illustrated and described herein with reference to illustrative embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A storage tunnel assembly for a bed of a pickup truck or other vehicle, the storage tunnel assembly comprising:
    a vertical wall separated from a bulkhead of the bed and disposed across a width of the bed; and
    a cover separated from a floor of the bed between the vertical wall and the bulkhead and disposed across the width of the bed;
    wherein the vertical wall, the cover, the bulkhead, and the floor define a storage space within a space defined by the bed and;
    wherein the vertical wall and the cover are adapted to be repositioned such that one of the vertical wall and the cover are disposed adjacent and substantially parallel to the floor and form an additional floor of the bed defining a reduced storage space between the floor and the additional floor.

2. The storage tunnel assembly of claim 1, wherein the vertical wall is rigidly attached or disposed adjacent to the cover in a substantially perpendicular configuration, such that the vertical wall and the cover may be collectively rotated or separately repositioned such that the vertical wall is repositioned to form at least a part of or be disposed adjacent to the bulkhead and the cover is repositioned to form at least a part of or be disposed adjacent to the floor, thereby eliminating the storage space from within or dividing the space defined by the bed.

3. The storage tunnel assembly of claim 1, wherein the vertical wall is pivotably attached to the cover, such that the vertical wall and the cover may be partially or wholly collapsed together, collectively rotated, and un-collapsed such that the vertical wall is repositioned to form at least a part of or be disposed adjacent to the bulkhead and the cover is repositioned to form at least a part of or be disposed adjacent to the floor, thereby eliminating the storage space from within or dividing the space defined by the bed.

4. The storage tunnel assembly of claim 1, wherein the vertical wall is pivotably attached to the cover and one of the cover is pivotably attached to the bulkhead and the vertical wall is pivotably attached to the floor, such that the vertical wall and the cover may be partially or wholly collapsed together, reoriented, and un-collapsed such that the vertical wall is repositioned to form at least a part of or be disposed adjacent to the floor and the cover is repositioned to form at least a part of or be disposed adjacent to the bulkhead, thereby eliminating the storage space from within or dividing the space defined by the bed.

5. The storage tunnel assembly of claim 1, wherein the cover is one or more of removable from the bed and retractable to/into the bulkhead and the vertical wall is pivotably attached to the floor, such that, when the cover is removed or retracted, the vertical wall may be pivoted such that the vertical wall is repositioned to form at least a part of or be disposed adjacent to the floor, thereby eliminating the storage space from within or dividing the space defined by the bed.

6. The storage tunnel assembly of claim 1, wherein the cover is pivotably attached to the bulkhead and the vertical wall is pivotably attached to the floor, such that the cover may be pivoted such that the cover is repositioned to form at least a part of or be disposed adjacent to the bulkhead and the vertical wall may be pivoted such that the vertical wall is repositioned to form at least a part of or be disposed adjacent to the floor, thereby eliminating the storage space from within or dividing the space defined by the bed, wherein, when the vertical wall, the cover, the bulkhead, and the floor define the storage space within the space defined by the bed, an edge of the vertical wall contacts an edge of the cover along a sealing line.

7. The storage tunnel assembly of claim 1, wherein the vertical wall is pivotably attached to the cover, the cover is pivotably attached to the bulkhead, and the vertical wall is pivotably attached to the floor, and wherein the cover comprises a front panel pivotably attached to a rear panel, such that the front panel and the rear panel may be partially or wholly collapsed together, reoriented, and un-collapsed when the vertical wall is repositioned to form at least a part of or be disposed adjacent to the floor and the cover is repositioned to form at least a part of or be disposed adjacent to the bulkhead, thereby eliminating the storage space from within or dividing the space defined by the bed.

8. The storage tunnel assembly of claim 1, wherein one or both side walls of the bed define a storage tunnel access opening coincident with the storage space defined by the vertical wall, the cover, the bulkhead, and the floor.

9. The storage tunnel assembly of claim 8, wherein the one or both side walls of the bed comprise a door adapted to selectively open and close the associated storage tunnel access opening.

10. The storage tunnel assembly of claim 9, further comprising an external sealing structure disposed between the door and an associated side wall and an internal sealing structure disposed between the door and an edge of one or more of the vertical wall, the cover, the bulkhead, and the floor.

11. The storage tunnel assembly of claim 9, wherein the door comprises an external door pivotably attached to an internal door, further comprising a first external sealing structure disposed between the internal door and an associated side wall, a second external sealing structure disposed between the internal door and the external door, and an internal sealing structure disposed between the door and an edge of one or more of the vertical wall, the cover, the bulkhead, and the floor.

12. The storage tunnel assembly of claim 11, wherein the external door and the internal door are pivotably attached to the associated side wall at a lower portion of each of the external door and the internal door and the external door is deployable downwards to form one or more of a storage space extension, a shelf, a seat, and a step.

13. A vehicle, comprising:
   a pair of side walls defining a bed there between;
   a vertical wall separated from a bulkhead of the bed and disposed across a width of the bed; and
   a cover separated from a floor of the bed between the vertical wall and the bulkhead and disposed across the width of the bed;
   wherein the vertical wall, the cover, the bulkhead, and the floor define a storage space within a space defined by the bed; and
   wherein the vertical wall and the cover are adapted to be repositioned such that one of the vertical wall and the cover are disposed adjacent and substantially parallel to the floor and form an additional floor of the bed defining a reduced storage space between the floor and the additional floor.

14. The vehicle of claim 13, wherein the vertical wall is rigidly attached or disposed adjacent to the cover in a substantially perpendicular configuration, such that the vertical wall and the cover may be collectively rotated or separately repositioned such that the vertical wall is repositioned to form at least a part of or be disposed adjacent to the bulkhead and the cover is repositioned to form at least a part of or be disposed adjacent to the floor, thereby eliminating the storage space from within or dividing the space defined by the bed.

15. The vehicle of claim 13, wherein the vertical wall is pivotably attached to the cover, such that the vertical wall and the cover may be partially or wholly collapsed together, collectively rotated, and un-collapsed such that the vertical wall is repositioned to form at least a part of or be disposed adjacent to the bulkhead and the cover is repositioned to form at least a part of or be disposed adjacent to the floor, thereby eliminating the storage space from within or dividing the space defined by the bed.

16. The vehicle of claim 13, wherein the vertical wall is pivotably attached to the cover and one of the cover is pivotably attached to the bulkhead and the vertical wall is pivotably attached to the floor, such that the vertical wall and the cover may be partially or wholly collapsed together, reoriented, and un-collapsed such that the vertical wall is repositioned to form at least a part of or be disposed adjacent to the floor and the cover is repositioned to form at least a part of or be disposed adjacent to the bulkhead, thereby eliminating the storage space from within or dividing the space defined by the bed.

17. The vehicle of claim 13, wherein the cover is one or more of removable from the bed and retractable to/into the bulkhead and the vertical wall is pivotably attached to the floor, such that, when the cover is removed or retracted, the vertical wall may be pivoted such that the vertical wall is repositioned to form at least a part of or be disposed adjacent to the floor, thereby eliminating the storage space from within or dividing the space defined by the bed.

18. The vehicle of claim 13, wherein the cover is pivotably attached to the bulkhead and the vertical wall is pivotably attached to the floor, such that the cover may be pivoted such that the cover is repositioned to form at least a part of or be disposed adjacent to the bulkhead and the vertical wall may be pivoted such that the vertical wall is repositioned to form at least a part of or be disposed adjacent to the floor, thereby eliminating the storage space from within or dividing the space defined by the bed, wherein, when the vertical wall, the cover, the bulkhead, and the floor define the storage space within the space defined by the bed, an edge of the vertical wall contacts an edge of the cover along a sealing line.

19. The vehicle of claim 13, wherein the vertical wall is pivotably attached to the cover, the cover is pivotably attached to the bulkhead, and the vertical wall is pivotably attached to the floor, and wherein the cover comprises a front panel pivotably attached to a rear panel, such that the front panel and the rear panel may be partially or wholly collapsed together, reoriented, and un-collapsed when the vertical wall is repositioned to form at least a part of or be disposed adjacent to the floor and the cover is repositioned to form at least a part of or be disposed adjacent to the bulkhead, thereby eliminating the storage space from within or dividing the space defined by the bed.

20. A method for providing a storage tunnel assembly for a bed of a pickup truck or other vehicle, the method comprising:
   providing a vertical wall separated from a bulkhead of the bed and disposed across a width of the bed; and
   providing a cover separated from a floor of the bed between the vertical wall and the bulkhead and disposed across the width of the bed;
   wherein the vertical wall, the cover, the bulkhead, and the floor define a storage space within a space defined by the bed; and
   repositioning the vertical wall and the cover such that one of the vertical wall and the cover are disposed adjacent and substantially parallel to the floor and form an additional floor of the bed defining a reduced storage space between the floor and the additional floor.

* * * * *